Feb. 20, 1934.    H. C. DUUS    1,948,441
MANUFACTURE OF OXALIC ACID
Filed Feb. 27, 1932
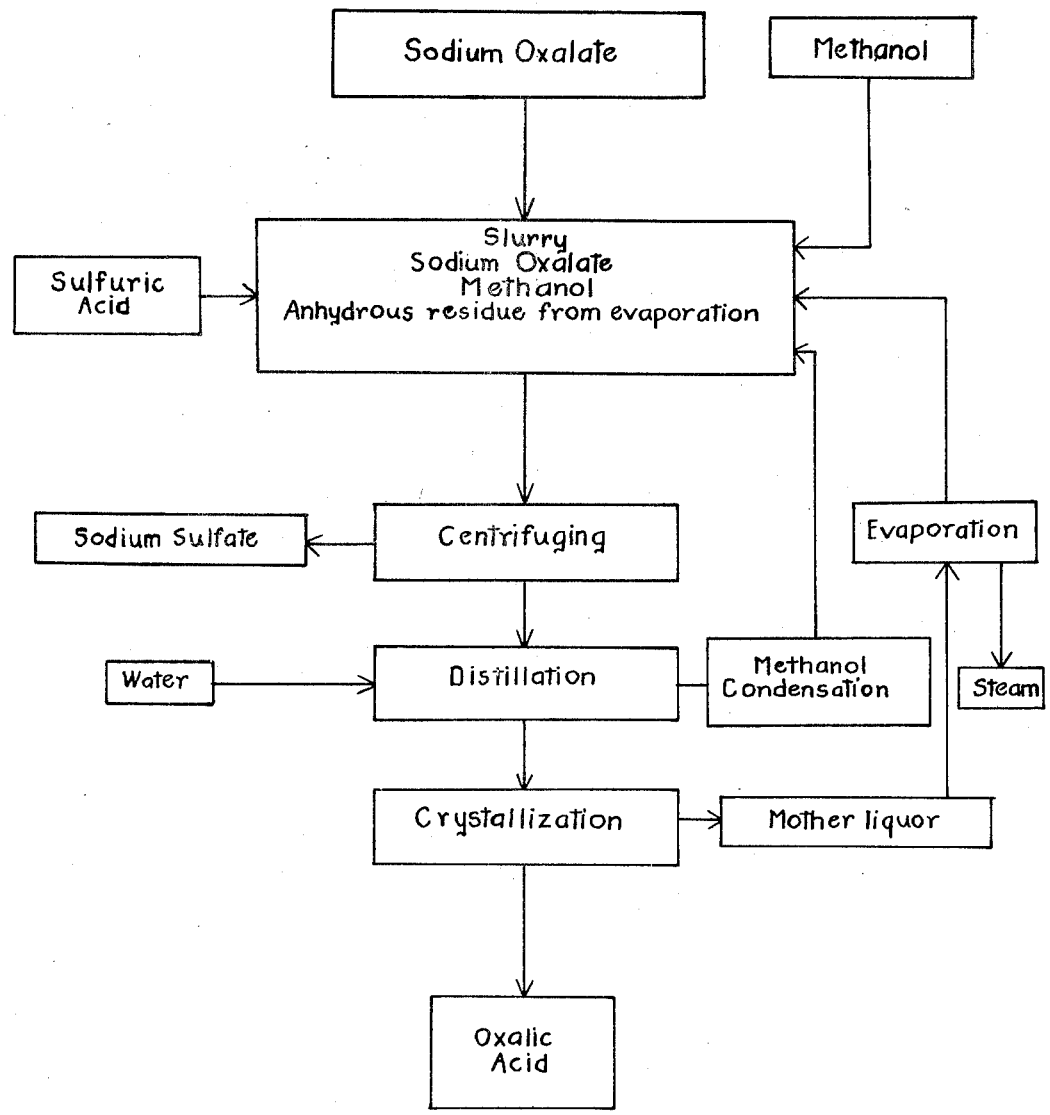
INVENTOR.
Hans C. Duus
BY
ATTORNEY.

Patented Feb. 20, 1934

1,948,441

UNITED STATES PATENT OFFICE 1,948,441

MANUFACTURE OF OXALIC ACID

Hans C. Duus, Greenville, Del., assignor to E. I. du Pont de Nemours & Company, Wilmington, Del., a corporation of Delaware Application February 27, 1932. Serial No. 595,448

13 Claims. (Cl. 260—118)

This invention relates to a process for the manufacture of oxalic acid and more particularly to the manufacture of this acid from sodium oxalate by treatment with a mineral acid.

The process usually employed heretofore for the conversion of sodium oxalate to oxalic acid has been conducted in the following manner.

The sodium oxalate is usually causticized with milk of lime to give calcium oxalate together with dilute sodium hydroxide as a by-product. In order to convert the oxalate of lime to oxalic acid, sulfuric acid is generally employed in order that a water insoluble calcium sulfate is produced which can be readily separated from the oxalic acid. By such a process an expensive raw material, sulfuric acid, gives a by-product, calcium sulfate, which has practically no resale value. Other disadvantages are encountered when attempting to prepare oxalic acid from sodium oxalate in accord with the above described process.

An object of the present invention is to provide a process for the preparatiton of oxalic acid from sodium oxalate which eliminates many of the disadvantages encountered in processes used heretofore.

Another object of the present invention is to provide a process of the type described in which the neutralizing step with lime is eliminated.

A further object of the present invention is to effect the conversion of the sodium oxalate to oxalic acid by means of mineral acid or acid anhydride but in contradistinction to the prior art effecting the conversion in an organic liquid medium rather than in an aqueous liquid medium.

Another important object of the invention is to provide a process for the conversion of sodium oxalate to oxalic acid in which the mineral acid employed is converted, not to a worthless by-product, but to one having a good market value. Other objects and advantages of my invention will hereinafter appear.

I have made the discovery that the alkali metal oxalates can be converted by various chemical reactions into oxalic acid without going thru the heretofore apparently necessary step of neturalizing with milk of lime to give a calcium oxalate. This step of the process can be entirely eliminated by employing an organic liquid, such as an alcohol, as the reacting medium rather than by carrying out the reaction in the usual manner in an aqueous solution. All organic liquids are, of course, not suitable for this purpose. I have found, however, that organic liquids, which under the existing conditions are not solvents of the alkali metal salt of the mineral acid but which are solvents for the oxalic acid and/or compounds thereof formed in the solution, are suitable. The alcohols are particularly well adapted for they aid in forcing the reaction by combining with the oxalic acid to form the alkyl oxalate. Sodium sulfate particularly settles rapidly from such solutions and can be readily removed by settling, filtering, or centrifuging. Furthermore, the by-products of such a reaction, the alkali metal sulfates, have a good resale value and by the recirculatory process which will hereinafter be described, substantially no losses are encountered either of the liquid reacting medium or of the acid or oxalate employed.

I will now describe examples illustrating my invention, but it will be understood that I am not limited in any way by the specific details given therein.

By reference to the accompanying flow sheet the various steps of my process will be more easily followed.

*Example I.*—A methanol-sodium oxalate slurry was made by intimately mixing approximately 300 parts by weight of methanol with 100 parts by weight of sodium oxalate. 84 parts by weight of 96%, or stronger, sulfuric acid was then added to the slurry and the resulting mixture agitated for about two hours, during which time methyl oxalate and insoluble sodium sulfate were formed. A slight excess of sulfuric acid was used to prevent the formation of insoluble sodium acid oxalate. The insoluble sodium sulfate was separated from the methyl oxalate-methanol-sulfuric acid solution by centrifuging, leaving in solution the excess sulfuric acid, methyl oxalate and a small quantity of sodium sulfate, together with the excess methanol. 350 parts by weight of water was then added to the solution to hydrolyze the methyl oxalate to oxalic acid and methanol and the methanol was distilled out and returned to the first steps of the process for re-use. The residue in the still was cooled to crystallize out oxalic acid, leaving a mother liquor containing water, sulfuric acid, a small amount of oxalic acid, and sodium sulfate. After separating the mother liquor from the crystallized oxalic acid, the former, after one or more crystallizations to remove most of the oxalic acid, was evaporated to dryness, after addition of sufficient sodium oxalate to neutralize the excess sulfuric acid it contained. These materials were then returned to the original reaction vessel without substantially any loss in the cycle of the original raw materials employed.

*Example II.*—A slurry was made of 100 parts by weight of sodium oxalate with 300 parts by weight of methanol containing 58 parts by weight of hydrogen chloride,—the methanol-hydrogen chloride solution having been prepared by bubbling dry hydrogen chloride thru substantially anhydrous methanol. The reaction was completed in approximately one and a half hours. The sodium chloride was then removed from the solution by centrifuging and the excess hydrogen chloride in the solution neutralized with sodium oxalate to give sodium acid oxalate, which precipitates from this solution. The methanol solution was decanted from the sodium acid oxalate and the latter returned to the next batch of slurry to be treated. The decanted liquor was treated with 350 parts by weight of water to hydrolyze the methyl oxalate to the dihydrated oxalic acid and to allow a sufficient amount in excess to permit easy crystallization. Subsequently the methanol was distilled from the aqueous methanol-oxalic acid solution, and the oxalic acid dihydrate crystallized from the aqueous solution.

In carrying out this reaction it is not essential as indicated above that methanol be employed as the reacting medium in which the sodium oxalate is converted to oxalic acid and a sodium salt, but any equivalent organic liquid may be used in which the sodium salt is substantially insoluble and which is also a good solvent for the oxalic acid or compound thereof. Of the alcohols, I have found that the lower molecular weight aliphatic organic alcohols or mixtures thereof and particularly methanol and ethanol are well adapted for this purpose and, altho the higher molecular weight alcohols are not as suitable generally as the lower, due to the fact that their preferential solubility for oxalic acid is less than that of the lower molecular weight alcohols, the higher alcohols may be used. I prefer generally, however, to use the lower members of the series.

As will be apparent to a skilled chemist, sulfuric acid is by no means the only acid that may be employed to convert the sodium oxalate to oxalic acid. Other mineral acids or acid anhydrides which are likewise suitable include the halogen acids and particularly hydrochloric, hydrobromic and hyriodic acids, and, in some instances, nitric acid may be employed as well as the acid anhydrides phosgene, sulfur trioxide, nitrogen dioxide, etc. When employing nitric acid or an oxide of nitrogen, however, due to their great oxidizing power, the temperature of the reaction which, in some instances is considerable, particularly during the addition of the acid to the sodium oxalate, should be kept down to inhibit as far as possible the oxidation caused by this acid.

The process may, if desired, be carried out as a batch process as described in the examples or by a continuous process as indicated in the flow sheet or by any other suitable process.

From a consideration of the above specification it will be realized that many variations and modifications of the above invention may be made. Such changes, however, will come within the scope of the invention without sacrificing any of the advantages that may be derived therefrom.

I claim:

1. In a process of making oxalic acid from an alkali metal oxalate in which the alkali metal oxalate is treated in solution with an acid, the step which comprises effecting the treatment in an organic liquid medium containing an acidic compound selected from the group consisting of highly ionizable mineral acids and highly ionizable mineral acid anhydrides, the solution of the acidic compound and the organic liquid medium being a solvent for oxalic acid and the compounds thereof formed in said solution and substantially a non-solvent for the alkali metal salt of the acidic compound.

2. In a process of making oxalic acid from an alkali metal oxalate in which the alkali metal oxalate is treated in solution with an acid, the step which comprises effecting the treatment in an organic liquid medium containing an acidic compound selected from the group consisting of sulfuric acid, hydrogen chloride, hydrogen bromide, hydrogen iodide, phosgene, sulfur trioxide and nitrogen dioxide, the solution of the acidic compound and the organic liquid medium being a solvent for oxalic acid and the compounds thereof formed in said solution and substantially a non-solvent for the alkali metal salt of the acidic compound.

3. In a process of making oxalic acid from sodium oxalate in which sodium oxalate is treated in solution with a mineral acid, the step which comprises effecting the treatment in a mineral acid-alcohol solution, the mineral acid being highly ionizable, the solution being a solvent for oxalic acid and the compounds thereof formed in the solution and substantially a non-solvent of the sodium salt of the mineral acid.

4. In a process of making oxalic acid from sodium oxalate in which sodium oxalate is treated in solution with a highly ionizable mineral acid, the step which comprises effecting the treatment in the methanol-mineral acid solution.

5. In a process of making oxalic acid from sodium oxalate in which sodium oxalate is treated in solution with a highly ionizable mineral acid, the step which comprises effecting the treatment of the sodium oxalate in an ethanol-mineral acid solution.

6. In a process of making oxalic acid from sodium oxalate in which sodium oxalate is treated in solution with a mineral acid, the step which comprises effecting the treatment in a sulfuric acid-methanol solution.

7. In a process of making oxalic acid from sodium oxalate in which sodium oxalate is treated in solution with a highly ionizable mineral acid, the steps which comprise making a slurry of sodium oxalate and an organic liquid, adding a mineral acid to the slurry, and separating the sodium salt of the mineral acid from the oxalic acid constituent formed, the organic liquid mineral acid solution maintaining the oxalic acid and compounds thereof in solution while the sodium salts of the mineral acid separate out.

8. In a process of making oxalic acid from sodium oxalate in which sodium oxalate is treated in solution with a mineral acid, the steps which comprise making a slurry of sodium oxalate and methanol, adding sulfuric acid to the slurry in excess of the amount required to change the sodium oxalate to methyl oxalate and sodium sulfate, removing the sodium sulfate from the resulting solution, adding water to the solution to hydrolyze the methyl oxalate to oxalic acid and methanol, distilling the methanol therefrom and returning it to the first step of the process, and finally crystallizing from the undistilled residue the oxalic acid contained therein.

9. In a process of making oxalic acid from sodium oxalate in which sodium oxalate is treated in solution with a mineral acid, the steps which comprise making a slurry of sodium oxalate and methanol, adding sulfuric acid to the slurry in excess of the amount required to convert the sodium oxalate to methyl oxalate and sodium sulfate, separating the sodium sulfate from the resulting solution, adding water to the solution to hydrolyze the methyl oxalate to oxalic acid and methanol, distilling the methanol from the hydrolyzed mixture, the methanol being returned to the first step of the process, cooling the still residue to crystallize out the oxalic acid, adding sodium oxalate to the mother liquor after separation of the crystallized oxalic acid therefrom to neutralize the excess sulfuric acid contained therein, and after drying the substantially oxalic acid-free mother liquor, returning it to the first step of the process.

10. In a process of making oxalic acid from an alkali metal oxalate in which the alkali metal oxalate is treated in solution with an acid, the step which comprises effecting the treatment in a liquid containing an aliphatic monohydric alcohol and an acidic compound selected from the group consisting of highly ionizable mineral acids and highly ionizable mineral acid anhydrides, the aliphatic monohydric alcohol and the acidic compound being a solvent for oxalic acid and the compounds thereof formed in the solution and substantially a non-solvent for the alkali metal salt of the acidic compound.

11. In a process of making oxalic acid from an alkali metal oxalate in which the alkali metal oxalate is treated in solution with an acid, the step which comprises effecting the treatment in a liquid medium containing an aliphatic monohydric alcohol and an acidic compound selected from the group consisting of sulfuric acid, hydrogen chloride, hydrogen bromide, hydrogen iodide, phosgene, sulfur trioxide and nitrogen dioxide, the solution of the acidic compound and the aliphatic monohydric alcohol being a solvent for oxalic acid and the compounds thereof formed in the solution and substantially a non-solvent for the alkali metal salt of the acidic compound.

12. In a process of making oxalic acid from sodium oxalate in which sodium oxalate is treated in solution with a mineral acid, the step which comprises effecting the treatment in a mineral acid-aliphatic monohydric alcohol solution, the mineral acid being highly ionizable, the solution being a solvent for oxalic acid and the compounds thereof formed in the solution and substantially a non-solvent for the sodium salt of the mineral acid.

13. In a process for making oxalic acid from sodium oxalate in which sodium oxalate is treated in solution with a mineral acid, the steps which comprise making a slurry of sodium oxalate and an aliphatic monohydric alcohol, adding a mineral acid that is highly ionizable to the slurry, and separating the sodium salt of the mineral acid from the oxalic acid constituent formed, the aliphatic monohydric alcohol-mineral acid solution maintaining the oxalic acid and compounds thereof in solution while the sodium salts of the mineral acid separate out.

HANS C. DUUS.